US012741201B2

(12) United States Patent
Zhao et al.

(10) Patent No.: US 12,741,201 B2
(45) Date of Patent: Sep. 22, 2026

(54) IMAGE PROCESSING METHOD AND APPARATUS, SERVER, AND MEDIUM

(71) Applicant: TENCENT TECHNOLOGY (SHENZHEN) COMPANY LIMITED, Shenzhen (CN)

(72) Inventors: Xinda Zhao, Shenzhen (CN); Minhua Xu, Shenzhen (CN); Zhipeng Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 934 days.

(21) Appl. No.: 17/885,426

(22) Filed: Aug. 10, 2022

(65) Prior Publication Data

US 2022/0379204 A1 Dec. 1, 2022

Related U.S. Application Data

(63) Continuation of application No. PCT/CN2021/099038, filed on Jun. 9, 2021.

(30) Foreign Application Priority Data

Aug. 6, 2020 (CN) ........................ 202010794044.1

(51) Int. Cl.
*A63F 13/355* (2014.01)

(52) U.S. Cl.
CPC ...... *A63F 13/355* (2014.09); *A63F 2300/535* (2013.01); *A63F 2300/538* (2013.01)

(58) Field of Classification Search
CPC .............. A63F 13/355; A63F 2300/535; A63F 2300/538
See application file for complete search history.

(56) References Cited

U.S. PATENT DOCUMENTS 8,964,830 B2 * 2/2015 Perlman ............ H04N 21/6587 345/161
9,077,991 B2 * 7/2015 Perlman ................ H04L 65/752
(Continued)

FOREIGN PATENT DOCUMENTS

CN 108079578 A 5/2018
CN 110180166 A 8/2019
(Continued)

OTHER PUBLICATIONS

The World Intellectual Property Organization (WIPO) International Search Report for PCT/CN2021/099038 Sep. 8, 2021 6 Pages (including translation).
(Continued)

*Primary Examiner* — Ankit B Doshi
(74) *Attorney, Agent, or Firm* — Anova Law Group, PLLC

(57) ABSTRACT

Embodiments of this application disclose an image processing method and apparatus, a server, and a medium. The method is performed by a server, and includes obtaining, when running a target cloud game, feedback data transmitted by a target game client, the feedback data reflecting a frame rate need of the target game client; determining an encoding frame rate according to the feedback data; performing image encoding on a game screen of the target cloud game according to the encoding frame rate to obtain encoded data; and transmitting the encoded data to the target game client.

20 Claims, 8 Drawing Sheets

(56) References Cited

U.S. PATENT DOCUMENTS

| | | | | |
|---|---|---|---|---|
| 9,138,644 | B2 * | 9/2015 | Perlman | H04N 19/61 |
| 9,192,859 | B2 * | 11/2015 | Perlman | H04N 19/188 |
| 9,314,691 | B2 * | 4/2016 | Perlman | H04L 65/765 |
| 9,781,477 | B2 * | 10/2017 | Mighani | H04L 65/765 |
| 2016/0007045 | A1 * | 1/2016 | Perlman | H04L 65/752<br>375/240.27 |
| 2018/0192081 | A1 * | 7/2018 | Huang | H04N 13/344 |
| 2019/0104311 | A1 * | 4/2019 | Amer | H04N 19/177 |
| 2019/0164518 | A1 * | 5/2019 | Dimitrov | G09G 5/393 |
| 2019/0364302 | A1 * | 11/2019 | Perlman | H04N 19/436 |

FOREIGN PATENT DOCUMENTS

| | | | |
|---|---|---|---|
| CN | 110841278 | A | 2/2020 |
| CN | 111135569 | A | 5/2020 |
| CN | 111882626 | A | 11/2020 |

OTHER PUBLICATIONS

The European Patent Office (EPO) The Extended European Search Report for 21853530.0 Nov. 7, 2023 11 Pages.

Huajun Hong et al. "Enabling adaptive cloud gaming in an open-source cloud gaming platform." IEEE Transactions on Circuits and Systems for Video Technology 25.12 (2015): 2078-2091. 14 pages.

* cited by examiner

IMAGE PROCESSING METHOD AND APPARATUS, SERVER, AND MEDIUM

RELATED APPLICATIONS

This application is a continuation application of PCT Application No. PCT/CN2021/099038, filed on Jun. 9, 2021, which claims priority to Chinese Patent Application No. 202010794044.1, entitled "IMAGE PROCESSING METHOD AND APPARATUS, SERVER, AND MEDIUM" filed on Aug. 6, 2020. The two applications are both incorporated by reference in their entirety.

FIELD OF THE TECHNOLOGY

This application relates to the field of Internet technologies, specifically, to the field of image processing technologies, and in particular, to an image processing method, an image processing apparatus, a server, and a computer storage medium.

BACKGROUND OF THE DISCLOSURE

With the development of Internet technologies, cloud gaming has attracted much attention. Cloud gaming may also be referred to as gaming on demand, and is a gaming mode based on cloud computing. Cloud computing is an Internet-based computing mode. Cloud gaming technology allows a client device with relatively limited graphic processing and data computing capabilities to run a high-quality game. In a cloud gaming scenario, a game is run on a cloud server instead of a game client of a player user. The cloud server encodes a game screen involved in the game scene into a video stream, and transmits the video stream to the game client of the player user through a network for playback. The game client of the player user does not need to have high graphic processing and data computing capabilities, and only needs to have a basic streaming playback capability and a capability of obtaining an input instruction of the player user and sending the input instruction to the cloud server.

In the cloud gaming scene, the effective utilization of processing resources (such as graphics processing unit (GPU) resources) of the cloud server is an important indicator. Therefore, how to use the processing resources of the cloud server appropriately has become a research hotspot.

SUMMARY

Embodiments of this application provide an image processing method and apparatus, a server, and a medium, which can appropriately use processing resources on a server side and improve effective utilization of the processing resources.

One aspect of this disclosure provides an image processing method, the method being performed by a server and includes obtaining, when running a target cloud game, feedback data transmitted by a target game client, the feedback data reflecting a frame rate need of the target game client; determining an encoding frame rate according to the feedback data; performing image encoding on a game screen of the target cloud game according to the encoding frame rate to obtain encoded data; and transmitting the encoded data to the target game client.

Another aspect of this disclosure provides a server, including an input interface and an output interface, and further including a computer storage medium, configured to store one or more instructions; and a processor, configured to load the one or more instructions stored in the computer storage medium to perform the following operations. The method includes obtaining, when running a target cloud game, feedback data transmitted by a target game client, the feedback data reflecting a frame rate need of the target game client; determining an encoding frame rate according to the feedback data; performing image encoding on a game screen of the target cloud game according to the encoding frame rate to obtain encoded data; and transmitting the encoded data to the target game client.

Another aspect of this disclosure provides provide a non-transitory computer storage medium, storing one or more instructions, the one or more instructions being adapted to be loaded by a processor and perform the following steps including obtaining, when running a target cloud game, feedback data transmitted by a target game client, the feedback data reflecting a frame rate need of the target game client; determining an encoding frame rate according to the feedback data; performing image encoding on a game screen of the target cloud game according to the encoding frame rate to obtain encoded data; and transmitting the encoded data to the target game client.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes technical solutions in the embodiments of this application with reference to the accompanying drawings in the embodiments of this application.

To run a cloud game, an embodiment of this application provides a cloud gaming environment. In the cloud gaming environment, a plurality of operating systems may be run on an independent server (for example, a server with an architecture such as an ARM or x86 architecture) by running a system container, and related images are transmitted to a remote receiving program through a video stream for processing. The ARM architecture is a processor architecture of a 32-bit or 64-bit reduced instruction set, and the x86 architecture is a computer language instruction set executed by a microprocessor. The container refers to a virtualized type on an operating system level and may be configured to carry an operating system. The container may be implemented by using an isolation mechanism (for example, a namespace). In a kernel mode, a plurality of operating systems (that is, a server operating system and a device operating system) share a same kernel; and in a user mode, the plurality of operating systems remain independent of each other. The server operating system refers to a general-purpose operating system, for example, a Linux operating system in the server. The device operating system refers to an operating system, for example, an Android operating system, an IOS operating system, or the like in the container.

The system container refers to a container and may be run based on the server operating system (for example, the Linux operating system). For example, the system container may be an Android container running on an open-source Linux operating system, and a plurality of Android containers may simultaneously run on one Linux operating system. An Android image is loaded on the Android container. The image is a file storage form. Multiple files are combined into one image file through mirroring, which can facilitate distribution and use of the file. It is to be understood that the system container mentioned in this embodiment is not limited to the Android container. For example, the system container may also be an IOS container when the IOS operating system supports open-source research and development. Accordingly, in the cloud gaming environment provided in this embodiment, a large quantity of system containers may be deployed on an independent server, and powerful capabilities of a central processing unit (CPU) and a graphics processing unit (GPU) on a server side may be fully used, to implement highly concurrent execution of system operations, thereby increasing the running speed of the cloud game.

Figure 1A:
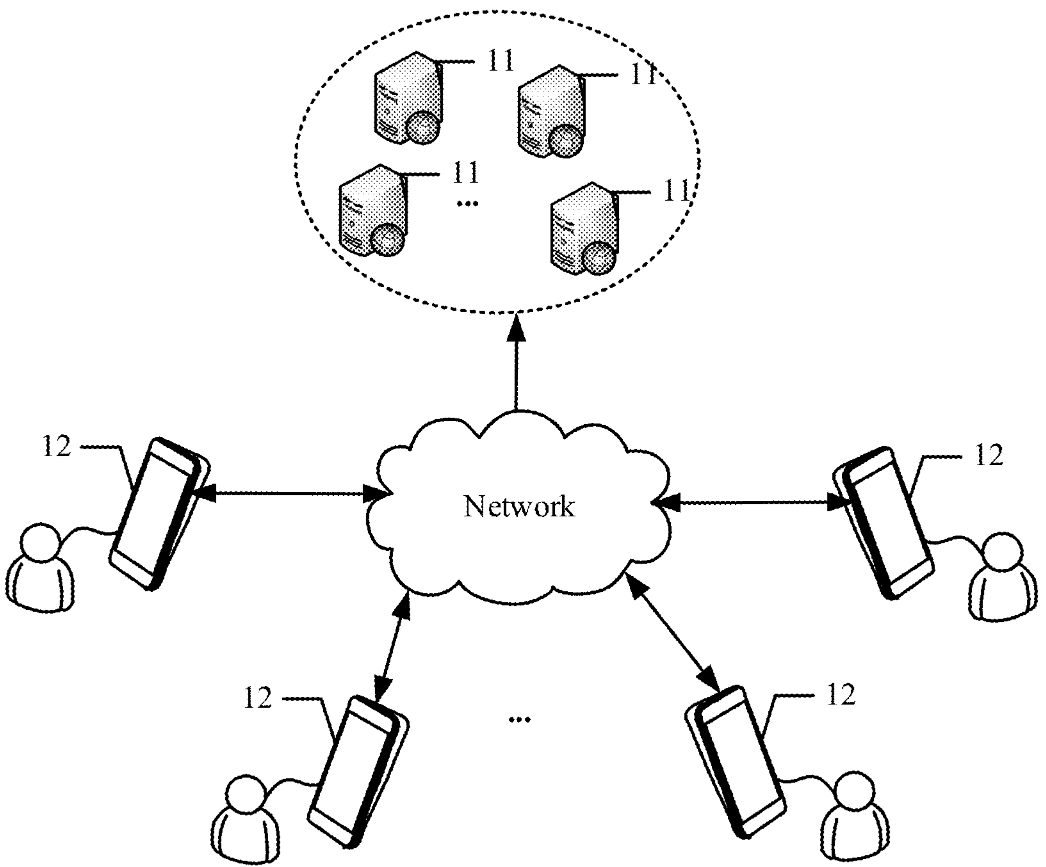
FIG. 1*a* is a diagram of a system architecture of a cloud gaming system according to an embodiment of this application.
Figure 1B:
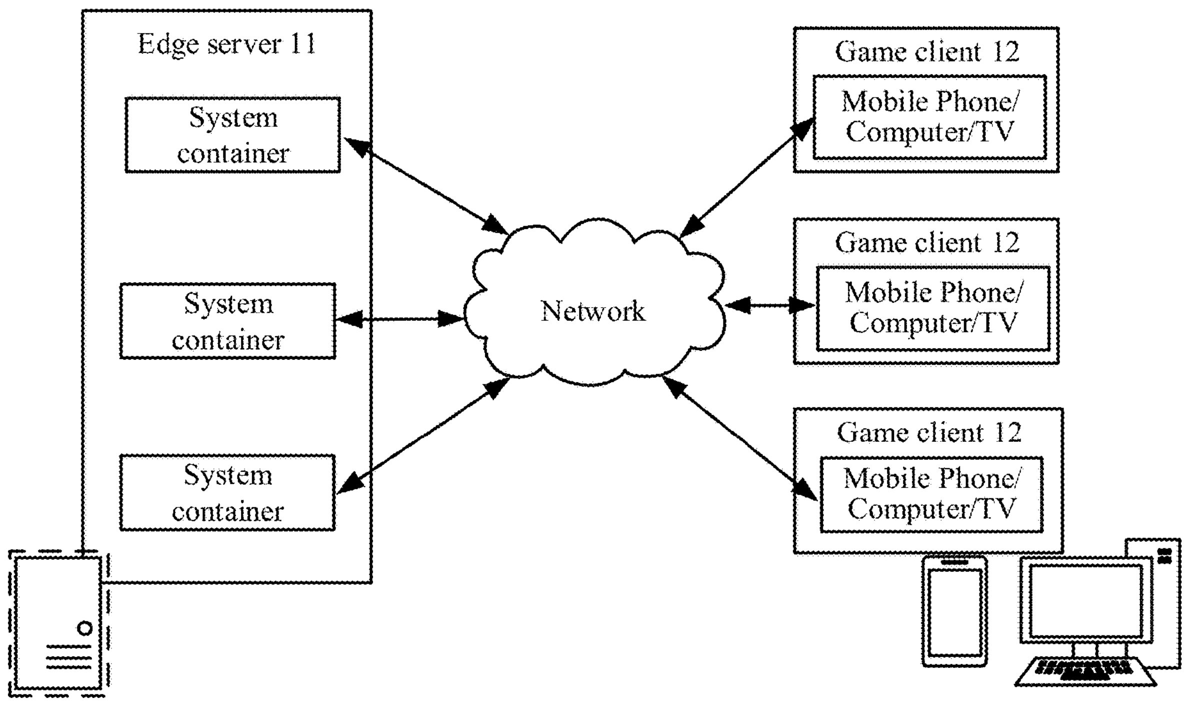
FIG. 1*b* is a schematic diagram of a connection between an edge server and a plurality of game clients according to an embodiment of this application.
Figure 1C:
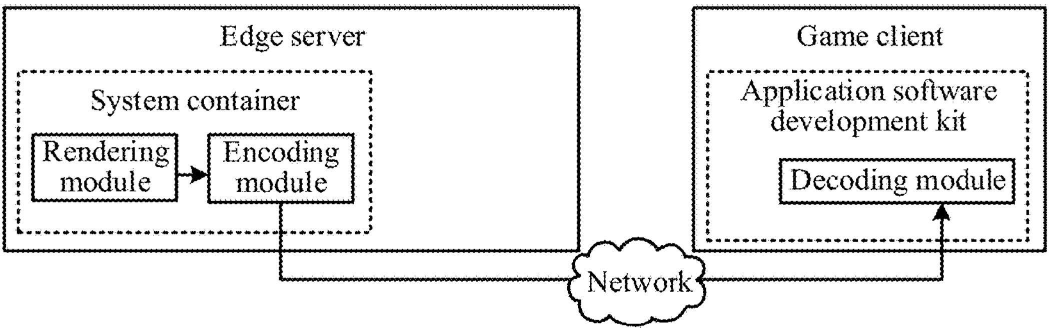
FIG. 1*c* is a schematic structural diagram of an edge server and a game client according to an embodiment of this application.

Based on the cloud gaming environment mentioned above, an embodiment of this application provides a cloud gaming system. Referring to FIG. 1*a*, the cloud gaming system may include at least one edge server 11 and a plurality of game clients 12. The edge server 11 refers to a server configured to run the system container. The server may be any independent physical server, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. As shown in FIG. 1*b*, at least one system container may be deployed inside each edge server 11, and each system container may be connected to at least one game client 12. One or more game applications (APPs) may be installed in each system container, and one or more cloud games may be run through the installed one or more game APPs. In addition, when running a cloud game, each system container can transmit a game screen of the a cloud game to the connected game client 12 for display. In addition, each edge server 11 may further include a rendering module configured to perform image rendering and an encoding module configured to perform image encoding, as shown in FIG. 1*c*. The rendering module and the encoding module may be located inside each system container or outside each system container. The encoding module may include a hardware device/software code capable of compressing an analog audio/video signal into encoded data (or an encoded file). For ease of elaboration, descriptions are provided subsequently by using an example in which both the rendering module and the encoding module are located inside the system container and the encoding module is a software device.

The game client 12 may be any terminal device (which is referred to as a terminal for short) having basic capabilities such as a streaming playback capability, a man-machine interaction capability, and a communication capability, for example, a smartphone, a tablet computer, a notebook computer, a desktop computer, a smart television, or the like. Alternatively, the game client 12 may be an application running in a terminal device. Specifically, the game client 12 may further include a decoding module configured to perform image decoding. The decoding module may include a hardware device/software code capable of converting encoded data (or an encoded file) into an analog audio/video signal. For ease of elaboration, descriptions are provided subsequently by using an example in which the decoding module is a software device. In this case, the decoding module may be located in an application software development kit (SDK) in the game client 12. It is to be understood that, FIG. 1*a* shows a system architecture of a cloud gaming system and is not intended to limit a specific architecture of the cloud gaming system. For example, in other embodiments, the cloud gaming system may further include a backend server for scheduling, and the like.

The following elaborates a specific process of a cloud game based on the foregoing cloud gaming system.

After an image file of the cloud game is created, the image file of the cloud game may be deployed to the edge server, so that the edge server can start a corresponding system container by loading the image file. When receiving a connection request related to the cloud game sent by a game client, the edge server may allocate a corresponding system container to establish a connection to the game client. After the allocated system container and the game client are successfully connected, the allocated system container can run the cloud game. In addition, when running the cloud game, the system container or the game APP in the system container can call a rendering instruction on a side of the edge server to initiate a rendering operation, to trigger the rendering module in the edge server to render a game screen of the cloud game in real time by performing the rendering operation. The rendering instruction herein may include, but is not limited to an OpenGL instruction, an OpenGL ES instruction, a Vulkan instruction, or the like. OpenGL is a cross-platform application programming interface (API) for rendering 3D graphics. OpenGL ES is a subset of the OpenGL API, mainly applied to an embedded device (such as a smartphone). Vulkan is another cross-platform 2D and 3D graphics API. OpenGL, OpenGL ES, and Vulkan APIs can all be implemented through Mesa. Mesa is an open-source computer graphics library.

Figure 1D:
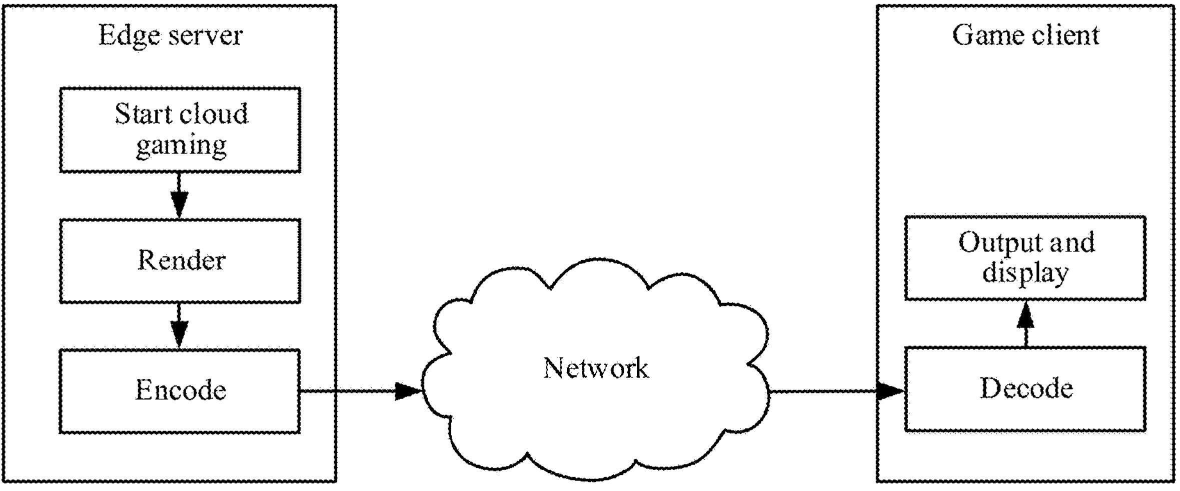
FIG. 1*d* is a schematic diagram of image processing performed by an edge server and a game client according to an embodiment of this application.

Then, the encoding module may be called to perform an image compression and encoding operation on the rendered game screen according to a video encoding standard (such as H.264 or H.265), to save network bandwidth occupied during subsequent image transmission. Subsequently, encoded data (that is, a compressed image) obtained through the image compression may be transmitted to the game client in a manner of video streaming, as shown in FIG. 1*d*. After receiving the encoded data, the game client may perform a decoding operation on the encoded data by using the decoding module to restore an original game screen and output and display the decoded game screen. In addition, in the process of displaying the game screen, the game client may further send a user input event (for example, a mouse click event or a keyboard operation event) of a player user for the game screen to the corresponding system container in a manner of data streams. The corresponding system container may be further responsible for capturing render a rendering buffer image corresponding to the operation even, and returning the captured image to the game client for display.

During the process of operating the cloud game, the embodiments of this application provide a feedback-based dynamic frame rate adjustment mechanism. The feedback-based dynamic frame rate adjustment mechanism herein refers to a mechanism of dynamically adjusting at least one frame rate of a rendering frame rate and an encoding frame rate on the server side according to a frame rate requirement fed back by the game client in real time or periodically. The frame rate is the number of frames per unit time (usually one second), which may be expressed in frames per second (FPS). The number of frames herein refers a quantity of frames. For the rendering process, the rendering module (such as GPU hardware) stores rendered image data (such as a game screen) into a display buffer (usually referred to as a frame buffer), and image data involved in each time of storage can represent one frame. For the encoding process, the encoding module reads the corresponding image data from the display buffer, and image data involved in each time of reading represents one frame. Through the feedback-based dynamic frame rate adjustment mechanism provided in the embodiments of this application, effective utilization of processing resources (such as GPU resources or CPU resources) can be dynamically adjusted by dynamically adjusting a rendering frame rate and/or an encoding frame rate, thereby maximizing the effective utilization of the processing resources.

Figure 1E:
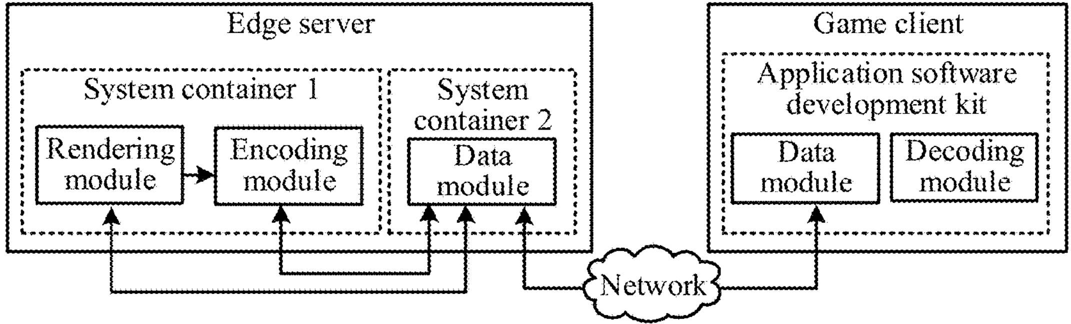
FIG. 1*e* is a schematic structural diagram of another edge server and another game client according to an embodiment of this application.
Figure 1F:
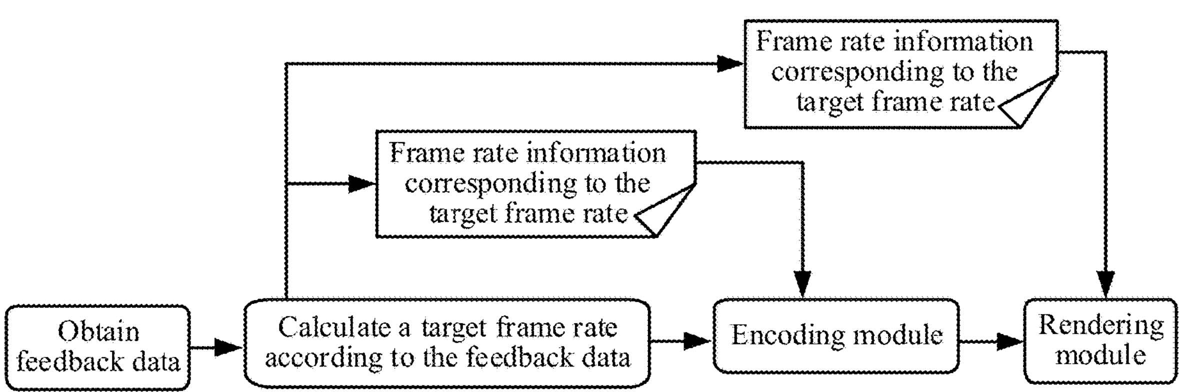
FIG. 1*f* is a schematic diagram of transmitting frame rate information of a target frame rate to an encoding module and a rendering module according to an embodiment of this application.
Figure 1G:
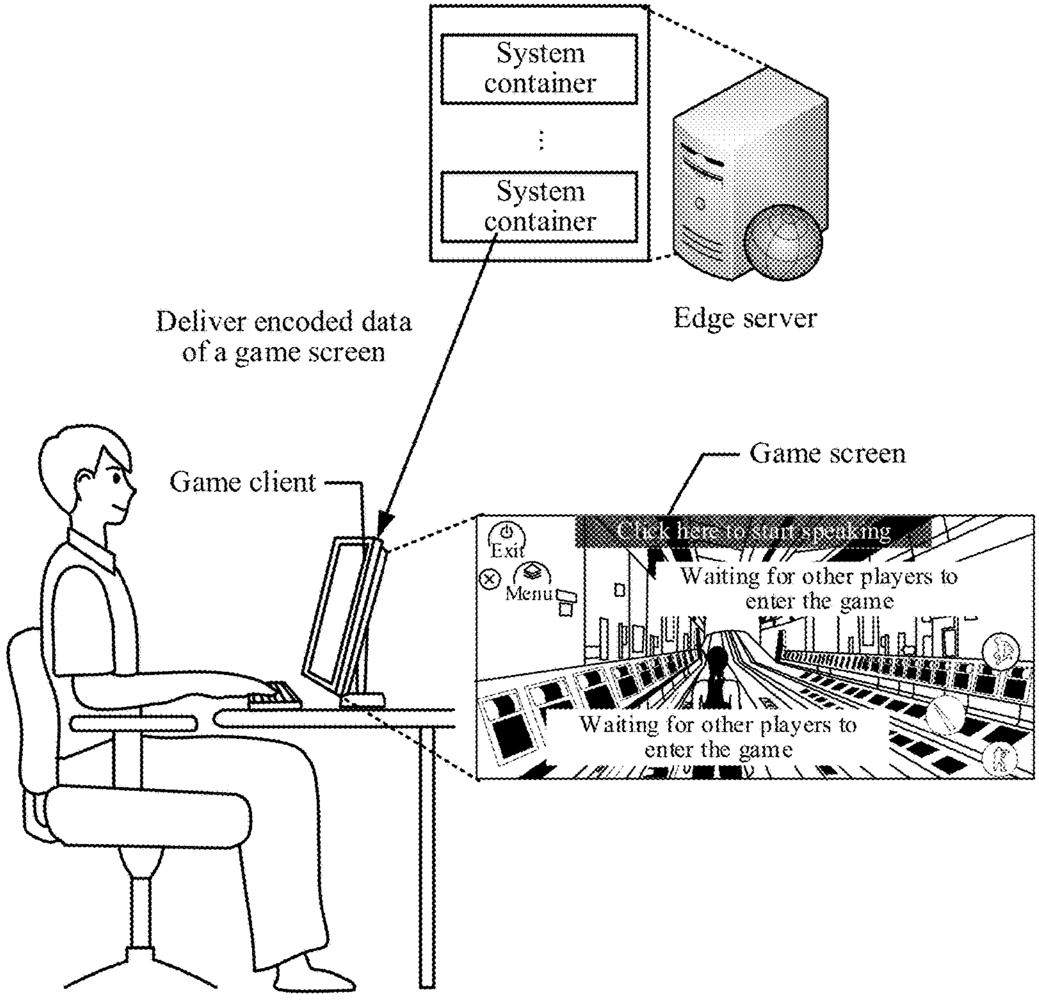
FIG. 1*g* is a schematic diagram showing that an edge server transmits a game screen to a game client for display according to an embodiment of this application.

In order to better implement the feedback-based dynamic frame rate adjustment mechanism, the embodiments of this application further add a data module to each of the edge server and the game client in the cloud gaming system, for data feedback between the edge server and the game client, as shown in FIG. 1*e*. The data module in the game client is mainly responsible for: obtaining feedback data that can be used for reflecting a frame rate requirement of the game client; and communicating with the data module in the edge server in a manner of a network, to transmit the obtained feedback data to the edge server. The data module in the edge server is mainly responsible for: performing calculation according to the feedback data received from the data module of the game client, to generate frame rate information (for example, a frame rate parameter, a frame rate instruction, or a frame rate configuration file corresponding to a proper frame rate) acceptable and identifiable to the rendering module and the encoding module; and transferring the frame rate information to the rendering module and the encoding module (as shown in FIG. 1*f*), so that the rendering module and the encoding module can control, according to the received frame rate information, corresponding code logic to adjust the corresponding rendering frame rate and encoding frame rate and perform image rendering and image encoding according to the adjusted rendering frame rate and encoding frame rate, respectively. After obtaining the encoded data, the edge server may transmit the encoded data to the game client through the system container, so that the game client can display the game screen according to the encoded data, as shown in FIG. 1*g*.

FIG. 1*e* represents a location relationship and a connection relationship between modules and does not limit them. For example, in FIG. 1*e*, the rendering module and the encoding module in the edge server are located in a different system container from the data module. However, in some embodiments, all the three modules: the rendering module, the encoding module, and the data module may be located in the same system container, or all the three modules may be located outside all system containers. In another example, in FIG. 1*e*, the data module and the decoding module in the game client are not connected. However, in some embodiments, the data module in the game client may exchange data with the decoding module, and the like. In addition, the data exchange between the data module in the edge server and the data module in the game client may occur at a moment when the game client has just established a connection to the system container in the edge server (that is, a moment at which the cloud game starts running), or may occur at any moment after the cloud game has been running for a period of time.

Figure 2:
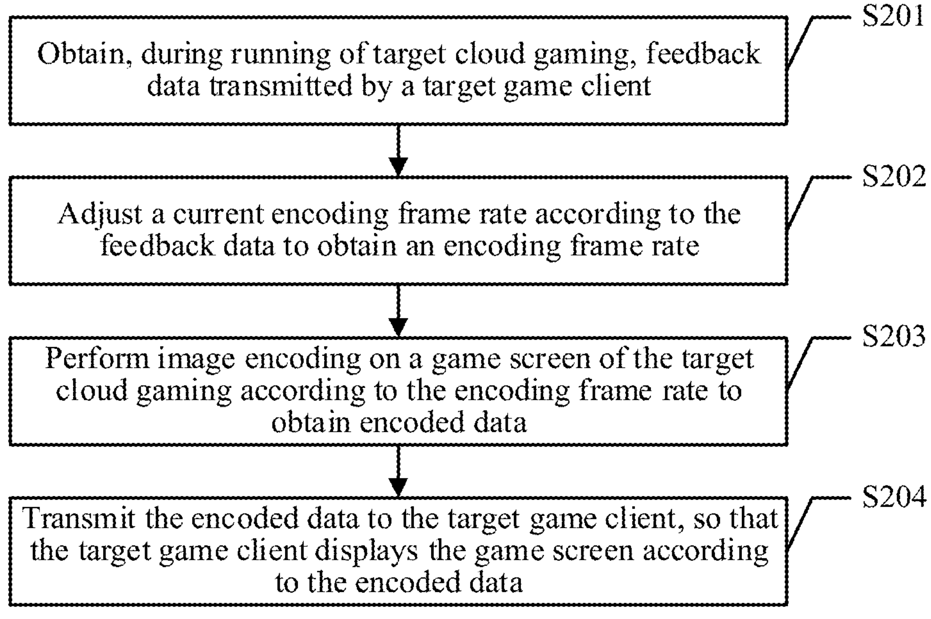
FIG. 2 is a schematic flowchart of an image processing method according to an embodiment of this application.

According to the related description of the foregoing feedback-based dynamic frame rate adjustment mechanism, an embodiment of this application provides an image processing method. The image processing method may be performed by a target edge server in the foregoing cloud gaming system. The target edge server is any edge server in the cloud gaming system. Referring to FIG. 2, the method may be performed by a server shown in FIG. 6, and may include the following steps S201 to S204:

S201. Obtain, when running a target cloud game, feedback data transmitted by a target game client.

In this embodiment, the target cloud game runs in a target container. The target container is any system container running in the target edge server. The target cloud game running in the target container may be any cloud gaming. It can be learned from the foregoing description that during the running of the target cloud game, all game screens involved in the target cloud game need to be delivered to the target game client for display. The target game client is any game client that establishes a connection to the target container. Research has shown that for the game screen of the target cloud game, the target game client usually has different frame rate requirements.

For example, for different hardware configurations, the target game client has different decoding capabilities. In this case, the frame rate requirements of the target game client usually vary with the different decoding capabilities. Specifically, for a particular resolution (for example, 720p or 1080p), if the target client has a relatively good hardware configuration (such as a GPU or a CPU), the target client usually may have a decoding capability of 60 frames/second (or even higher). In this case, the target edge server side has an adequate decoding capability when transmitting decoded data of a game screen at 60 frames per second to the target game client for decoding. Therefore, for such a target game client with a relatively better hardware configuration, a frame rate requirement thereof may be 60 frames/second (or even higher). However, if the target client has a relatively poor hardware configuration, the target game client usually has a decoding capability of only 30 frames/second (or even lower). In this case, the target edge server side has an inadequate decoding capability when transmitting decoded data of a game screen at 60 frames per second to the target game client for decoding, easily causing some images to be discarded, thus resulting in unnecessary waste. Therefore, for such a target game client with a relatively poor hardware configuration, a frame rate requirement may be 30 frames/second (or even lower).

In another example, the target cloud game usually has multiple application scenes in the target game client, such as a hosting scene, a user operation scene, and the like. The hosting scene herein is a scene in which a program controls a game object (a virtual person in the target cloud game) corresponding to the target game client. For different application scenes, the target game client has different frame rate requirements. Specifically, for the hosting scene, a player user on the side of the target game client usually does not use hosting for a smooth operation of the game; but for ensuring automatic running of the game in the hosting process. In this case, the target game client uses a low frame rate mode. That is, in the hosting scene, the frame rate requirement of the target game client may be 30 frames/second (or even lower). On the contrary, for a non-hosting scene, the target game client may use a high frame rate mode to meet a game smoothness requirement of the player user. That is, in the non-hosting scene, the frame rate requirement of the target game client may be 60 frames/second (or even higher).

In another example, limited to a network environment between the target game client and the target edge server side, the target game client has different frame rate requirements. For the target game client, when there is network congestion, a frame rate of 30 frames/second (or even lower) provided by the target edge server side may be its processing limit, and a higher frame rate only leads to more severe network congestion on the target game client side, thus affecting experience on the target game client. In this case, the target game client uses a low frame rate mode. The frame rate requirement of the target game client in this case may be 30 frames/second (or even lower). However, in a relatively good network environment, a frame rate of the server side may be appropriately increased, so that experience on the target client can be improved. It can be learned that, a relatively poor network environment corresponds to a relatively low frame rate requirement, and a relatively good network environment may correspond to a relatively high frame rate requirement.

In another example, there may be player users of different user types in the target cloud game. The user type herein may include a first type or a second type. A game service corresponding to the first type is superior to a game service corresponding to the second type. For example, a player user of the first type may be a member user, and a player user of the second type may be a non-member user. For player users of different user types, frame rate requirements of the target game client may also be different. Specifically, different types of player users usually enjoy different game experiences. For example, the player user of the first type (for example, the member user) may be provided with a frame rate of 60 frames/second, and the player user of the second type (for example, the non-member user) may be provided with a frame rate of 30 frames/second. Therefore, if the target game client is used by the player user of the first type, the frame rate requirement of the target game client may be 60 frames/second; if the target game client is used by the player user of the second type, the frame rate requirement of the target game client may be 30 frames/second, and so on.

In summary, the target edge server can provide the target game client with encoded data of game screens at different frame rates in a targeted manner by considering different frame rate requirements of the target game client to meet the different frame rate requirements of the target game client, so that the target game client can better display the game screens. Based on this, during the running of the target cloud game, the target edge server can obtain, in real time or periodically, feedback data sent by the target game client and used for reflecting the frame rate requirement of the target game client, so that a related frame rate (such as an encoding frame rate or a rendering frame rate) can be dynamically adjusted based on the feedback data, thereby proving the target client with corresponding encoded data according to the dynamically adjusted frame rate. Specifically, the feedback data may indicate at least one of the following: a hardware configuration of the target game client, an application scene of the target cloud game in the target game client, a network status between the target game client and the target edge server, a user type of a player user corresponding to the target game client, and the like. The frame rate requirement of the target game client can be determined by using the content indicated by the feedback data.

S202. Dynamically adjust a current encoding frame rate according to the feedback data to obtain an encoding frame rate. Hereinafter, the obtained encoding frame rate may also be referred to as adjusted encoding frame rate.

It can be learned from the foregoing description that a corresponding encoding operation needs to be performed on the side of the target edge server after a rendering operation is performed, to save network bandwidth occupied during data transmission between the target edge server and the target game client. Therefore, in the process of dynamically adjusting the related frame rate based on the feedback data, the encoding module may be used to first dynamically adjust the current encoding frame rate according to the feedback data to obtain an adjusted encoding frame rate. If step S202 is performed at a moment when the target cloud game starts running, the encoding frame rate herein may be a default encoding frame rate set for the target container in advance before the target container is started. If step S202 is performed after the target cloud game has been running for a period of time, the encoding frame rate herein may be a current encoding frame rate used for running the target cloud game currently.

Specifically, if the hardware configuration of the target game client indicated by the feedback data is relatively low (for example, a CPU model is relatively old, that is, the CPU model is earlier than a particular era or a particular version), or the application scene of the target cloud game in the target game client indicated by the feedback data is a hosting scene, or the network status between the target game client and the target edge server that is indicated by the feedback data is relatively congested, or the user type indicated by the feedback data is the second type (that is, the player user of the target game client is a user of the second type (such as a non-member user)), the encoding frame rate may be dynamically adjusted by using the encoding module, so that the adjusted encoding frame rate is a relatively small frame rate (for example, 30 frames/second, or smaller).

If the hardware configuration of the target game client indicated by the feedback data is relatively high (for example, a CPU model is relatively new, that is, the CPU model is later than a particular era or a particular version), or the application scene of the target cloud game in the target game client indicated by the feedback data is a non-hosting scene (that is, a normal usage scene), or the network status between the target game client and the target edge server that is indicated by the feedback data is relatively good, or the user type indicated by the feedback data is the first type (that is, the player user of the target game client is a user of the first type (such as a member user)), the encoding frame rate may be dynamically adjusted by using the encoding module, so that the adjusted encoding frame rate is a relatively large frame rate (for example, 60 frames/second, or larger).

S203. Perform image encoding on a game screen of the target cloud game according to the adjusted encoding frame rate to obtain encoded data.

S204. Transmit the encoded data to the target game client.

In steps S203 and S204, after obtaining the adjusted encoding frame rate, the target edge server may control the encoding module to perform, according to the adjusted encoding frame rate, image encoding on the game screen of the target cloud game to obtain the encoded data. Then, the encoded data may be transmitted to the target game client, so that the target game client displays the game screen according to the encoded data. After receiving the encoded data, the target game client may decode the encoded data to obtain the game screen of the target cloud game; and then display the game screen of the target cloud game in a user interface.

In this embodiment, feedback data transmitted by a target game client may be obtained when running a target cloud game. The feedback data can reflect the frame rate requirement of the target game client. Therefore, the server can dynamically adjust the encoding frame rate by considering the frame rate requirement reflected by the feedback data, and perform image encoding on the game screen of the target cloud game according to the adjusted encoding frame rate. In this way, processing resources occupied by the server side in the image encoding process are all valuable, and the occupancy of unnecessary processing resources can be reduced; thereby appropriately utilizing the processing resources on the server side and improving effective utilization of the processing resources. After the encoded data is obtained through image encoding, the encoded data obtained through image encoding can be transmitted to the target game client. Because the encoded data is obtained through encoding by considering the frame rate requirement of the target game client, the frame rate corresponding to the encoded data can be well adapted to the target game client, so that the target game client can well display the game screen according to the encoded data.

Figure 3:
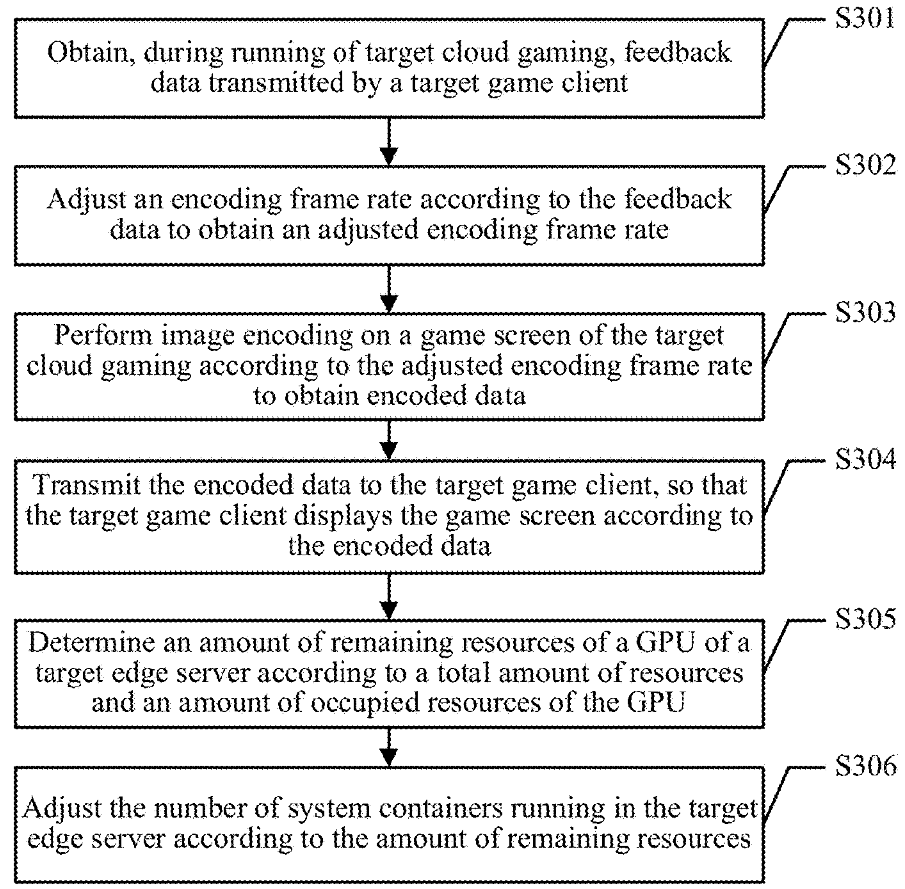
FIG. 3 is a schematic flowchart of another image processing method according to another embodiment of this application.

Based on the related description of the embodiment of the image processing method shown in FIG. 2, an embodiment of this application further provides a schematic flowchart of a more specific image processing method. The image processing method may be performed by a target edge server in the foregoing cloud gaming system. The target edge server is any edge server in the cloud gaming system. In this embodiment, game screens of the target cloud game are all obtained through rendering by the rendering module, and image encoding is performed by the encoding module. Referring to FIG. 3, the image processing method may include the following steps S301 to S306:

S301. Obtain, when running a target cloud game, feedback data transmitted by a target game client.

In this embodiment, the target cloud game can run in a target container, and the target game client is connected to the target container. The feedback data may include feedback information associated with at least one feedback indicator. The feedback indicator herein may include, but is not limited to: a hardware configuration indicator, an application scene indicator, a network status indicator, and a user type indicator. Specifically, feedback information under the hardware configuration indicator is hardware configuration information of the target game client, and may include at least one of the following: hardware information of a GPU corresponding to the target game client and hardware information of a CPU corresponding to the target game client. Specifically, the hardware information of the GPU corresponding to the target game client may include, but is not limited to a vendor identifier and a model identifier of the GPU corresponding to the target game client. The hardware information of the CPU corresponding to the target game client may include, but is not limited to a vendor identifier and a model identifier of the CPU corresponding to the target game client.

Feedback information under the application scene indicator is application scene information of the target cloud game in the target game client, and may include, but is not limited to a scene identifier of an application scene of the target cloud game in the target game client. The application scene may include a hosting scene or a non-hosting scene.

Feedback information under the network status indicator is network status information of the target game client, and may include at least one of the following: a network bandwidth, network dither information, and a network packet loss rate. The network bandwidth refers to an amount of data transmitted per unit time (usually one second). A larger network bandwidth indicates a better network environment. A network dither refers to a time difference between a maximum latency and a minimum latency involved in data transmission. The latency refers to duration between a data sending moment and a data receiving moment. A smaller network dither indicates a more stable network environment. The network packet loss rate refers a ratio of the number of lost data packets to the total number of transmitted data packets. A smaller network packet loss rate indicates a more stable network environment.

Feedback information under the user type indicator is user type information corresponding to the target game client, and may include a type identifier of a user type of a user account logged in to the target cloud game. The user type includes: a first type (such as a member) or a second type (such as a non-member).

In one embodiment, the target edge server and the target game client may exchange data through a custom protocol. The custom protocol may include a protocol variable corresponding to each feedback indicator, for example, cloudgame_cpu_vendor (a protocol variable used for recording a vendor identifier of the CPU corresponding to the target game client), cloudgame_cpu_device_id (a protocol variable used for recording a model identifier of the CPU corresponding to the target game client), cloudgame_gpu_vendor (a protocol variable used for recording a vendor identifier of the GPU corresponding to the target game client), and cloudgame_gpu_device_id (a protocol variable used for recording a model identifier of the GPU corresponding to the target game client) corresponding to the hardware configuration indicator; and cloudgame_network_dither (a protocol variable used for recording the network dither information) and cloudgame_network_loss_rate (a protocol variable used for recording the network packet loss rate) corresponding to the network status indicator, cloudgame_user_type (a protocol variable used for recording the type identifier) corresponding to the user type indicator, cloudgame_scene_id (a protocol variable used for recording the scene identifier) corresponding to the application scene indicator, and the like. In this case, in the processing of running the target cloud game in the target container, the target game client can obtain feedback information under each feedback indicator, and assign the obtained feedback information to the corresponding protocol variable to obtain feedback data. Then, the feedback data is transmitted to the target edge server. In one embodiment of step S301, the target edge server may receive the feedback data transmitted by the target game client.

S302. Dynamically adjust an encoding frame rate according to the feedback data to obtain an adjusted encoding frame rate.

In one embodiment, step S302 may be implemented as follows: First, a reference frame rate corresponding to the feedback information under each feedback indicator is obtained from the feedback data. Specifically, the feedback data may be first parsed according to a custom protocol agreed between the target edge server and the target game client to obtain the feedback information under each feedback indicator (that is, a value of each protocol variable). Then, a reference frame rate corresponding to the feedback information under each feedback indicator may be obtained. One feedback indicator corresponds to one frame rate lookup table. The frame rate lookup table includes multiple pieces of information and a frame rate corresponding to each piece of information. For example, a frame rate lookup table corresponding to the hardware configuration indicator may include multiple pieces of hardware configuration information (such as a CPU model or a GPU model) and a frame rate corresponding to each piece of hardware configuration information. A frame rate lookup table corresponding to the network status indicator may include frame rates corresponding to multiple pieces of network dither information, frame rates corresponding to multiple network packet loss rates, and the like. In this case, correspondingly, a reference frame rate corresponding to feedback information under any feedback indicator in the feedback data may be found by looking up a frame rate lookup table corresponding to the any feedback indicator.

Second, a target frame rate may be calculated according to the reference frame rate corresponding to the feedback information under each feedback indicator. Specifically, a lowest reference frame rate may be selected from the reference frame rates corresponding to the feedback information under the feedback indicators as the target frame rate. Alternatively, a mean value operation is performed on the reference frame rates corresponding to the feedback information under the feedback indicators to obtain the target frame rate. Alternatively, a weight value of each feedback indicator is obtained, and weighted summation is performed on the reference frame rates corresponding to the feedback information under the feedback indicators by using the weight value of each feedback indicator to obtain the target frame rate. Alternatively, a priority of each feedback indicator may be further determined, and a reference frame rate corresponding to feedback information under a feedback indicator with a highest priority is selected as the target frame rate, and so on. The embodiments of this application merely exemplify a plurality of target frame rate calculation methods, and are not exhaustive. For example, in other embodiments, an intermediate frame rate may be further obtained through calculation according to the reference frame rate corresponding to the feedback information under the each feedback indicator. The intermediate frame rate herein may include, but is not limited to: a lowest reference frame rate among the reference frame rates corresponding to the feedback information under the feedback indicators, an average value of the reference frame rates corresponding to the feedback information under the feedback indicators, a frame rate obtained by performing weighted summation on the reference frame rates corresponding to the feedback information under the feedback indicators by using the weight values of the feedback indicators, a reference frame rate corresponding to feedback information under a feedback indicator with a highest priority, and the like. Then, an average value between the intermediate frame rate and the current encoding frame rate is calculated to obtain the target frame rate. Such a calculation method can reduce a difference between the target frame rate and the current encoding frame rate, so that the frame rate can be subsequently adjusted more smoothly by using the target frame rate. Further, before calculation of the average value between the intermediate frame rate and the current encoding frame rate, it may be first determined whether a difference between the intermediate frame rate and the current encoding frame rate is greater than a difference threshold. If the difference is greater than the difference threshold, the step of calculating the average value between the intermediate frame rate and the current encoding frame rate may be performed. If the difference is not greater than the difference threshold, it indicates that the difference between the intermediate frame rate and the current encoding frame rate is not large. Therefore, the intermediate frame rate may be directly used as the target frame rate.

Figure 4A:
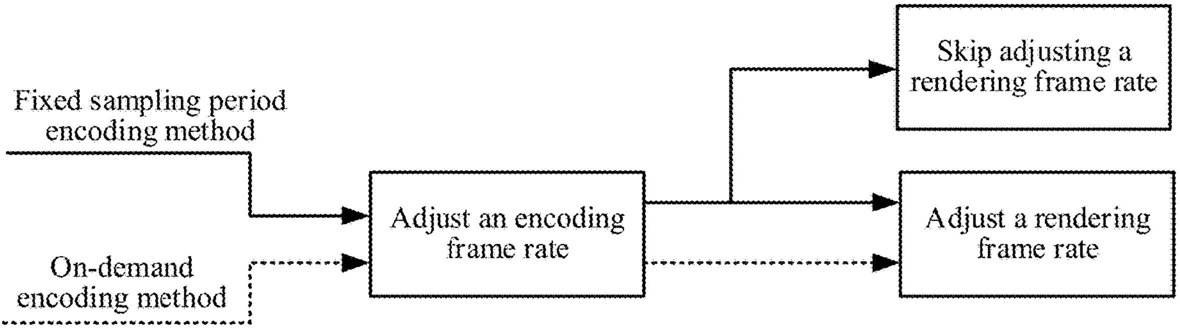
FIG. 4*a* is a schematic diagram of adjusting a frame rate based on two encoding methods according to an embodiment of this application.

Then, the encoding frame rate may be dynamically adjusted according to an encoding method by using the target frame rate to obtain the adjusted encoding frame rate, referring to FIG. 4*a*. The encoding method herein may be an on-demand encoding method or a fixed sampling period encoding method. The on-demand encoding method is a method in which the encoding module performs encoding according to a rendering progress of the rendering module. The fixed sampling period encoding method is a method in which the encoding module encodes, according to a fixed sampling period, the game screen rendered by the rendering module. The specific implementation of dynamically adjusting the encoding frame rate by using the target frame rate varies with different encoding methods. For details, refer to the following description:

(I) The Encoding Method is an On-Demand Encoding Method

In the on-demand encoding method, after a frame of game screen is rendered, the rendering module instructs the encoding module to perform an image encoding operation, and then the target edge server transfers, to the target game client, encoded data obtained after the encoding module performs the image encoding operation. Therefore, in this case, the encoding frame rate of the encoding module is determined by the rendering frame rate of the rendering module. In this case, in order to meet the frame rate requirement of the target game client, the encoding frame rate may be adjusted by adjusting the rendering frame rate of the rendering module. Research has shown that the rendering process of the rendering module is usually synchronized based on a vertical sync semaphore (vsync)

mechanism. Using an Android system as an example, a synchronization principle of the rendering process of the rendering module is roughly as follows: According to a hardware vertical sync semaphore (hardware vsync) in the Android system, two software vertical sync semaphores (software vsync) can be derived: first software vsync (such as software app vsync) for triggering layer data and second software vsync (software SurfaceFlinger vsync) for triggering layer merging work. After receiving the first software vsync (such as software app vsync), a data preparation module (such as a Choreographer module) may start to prepare layer data. After receiving the second software vsync (such as software SurfaceFlinger vsync), a layer merge module (such as a SurfaceFlinger module) may start layer merging work, so that the rendering module can perform a subsequent rendering operation. It can be learned that a generation period of software vsync can determine the magnitude of the rendering frame rate. In addition, software vsync is generated based on the hardware vertical sync semaphore and software vsync can be used for triggering screen rendering. Therefore, the rendering frame rate can be adjusted by adjusting the generation period of software vsync (such as software app vsync and software SurfaceFlinger vsync).

Figure 4B:
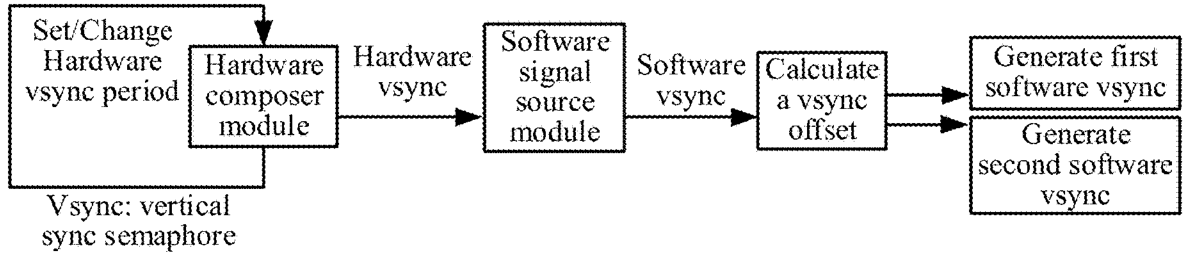
FIG. 4*b* is a schematic principle diagram of adjusting a frame rate in an on-demand encoding method according to an embodiment of this application.

Image refreshing and rendering may usually include a plurality of steps: preComposition, doComposition, and postComposition. In the preComposition phase, preparation work for layer composition is mainly carried out. In the doComposition phase, layer composition work is mainly handled. In the postComposition phase, some finishing work is mainly carried out, such as determining whether synchronization with hardware vsync is required to correct deviations of software vsync. Therefore, in the postComposition phase, vsync can be intervened by using this synchronization opportunity to implement adjustment of the rendering frame rate. For a specific intervention principle, refer to FIG. 4*b*. A generation period of hardware vsync in a hardware composer (HW Composer) module in an operating system may be changed, and software vsync and hardware vsync are triggered to perform a synchronization operation, so that a corresponding software signal source module (such as a DispSync module) calculates a vsync offset and then generates software vsync (such as software app vsync and software SurfaceFlinger vsync) according to the calculated vsync offset, causing a generation period of the software vsync to be also adjusted accordingly, thereby allowing the rendering frame rate to be changed, and thus allowing the encoding frame rate to be dynamically adjusted.

As such, a specific implementation of dynamically adjusting the encoding frame rate according to the encoding method by using the target frame rate to obtain the adjusted encoding frame rate may be as follows: First, the generation period of the hardware vertical sync semaphore is adjusted according to the target frame rate to obtain an adjusted generation period of the hardware vertical sync semaphore (that is, hardware vsync). Specifically, a reciprocal of the target frame rate may be calculated, and the generation period of the hardware vertical sync semaphore of the HW Composer module is adjusted according to the calculated reciprocal, so that the adjusted generation period of the hardware vertical sync semaphore is the reciprocal of the target frame rate. For example, if the target frame rate is 60 frames/second, the adjusted generation period of the hardware vertical sync semaphore may be $1/60$. Second, the generation period of the software vertical sync semaphore (that is, software vsync) may be synchronously adjusted based on the adjusted generation period of the hardware vertical sync semaphore; and the rendering frame rate of the rendering module is adjusted by using the adjusted generation period of the software vertical sync semaphore. Then, the encoding frame rate may be dynamically adjusted based on the adjusted rendering frame rate to obtain the adjusted encoding frame rate. The adjusted encoding frame rate is equal to the adjusted rendering frame rate.

(II) The Encoding Method is a Fixed Sampling Period Encoding Method

Figure 4C:
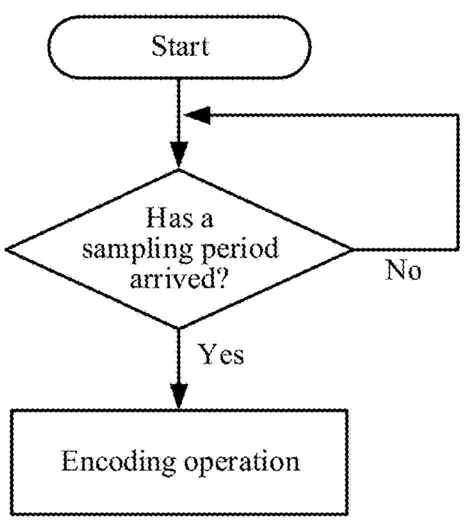
FIG. 4*c* is a schematic logic diagram of performing an encoding operation in a fixed sampling period encoding method according to an embodiment of this application.

In the fixed sampling period encoding method, the encoding module performs an encoding operation on an obtained game screen according to a fixed encoding sampling period. That is, referring to FIG. 4*c*, the encoding module detects in real time whether the encoding sampling period has arrived. One encoding operation can be performed each time it is detected that the encoding sampling period arrives. Therefore, in this case, the encoding frame rate of the encoding module and the rendering frame rate of the rendering module are independent of each other. Based on this, a specific implementation of dynamically adjusting the encoding frame rate according to the encoding method by using the target frame rate to obtain the adjusted encoding frame rate may be: updating the encoding frame rate by using the target frame rate to obtain the adjusted encoding frame rate. That is, the adjusted encoding frame rate is equal to the target frame rate. The updating the encoding frame rate by using the target frame rate herein refers to: generating, according to the target frame rate, frame rate information that is identifiable and acceptable to the encoding module, and transferring the frame rate information to the encoding module, so that after obtaining the target frame rate through identification according to the frame rate information, the encoding module updates the encoding frame rate by using the target frame rate to obtain the adjusted encoding frame rate. The frame rate information may include, but is not limited to: a frame rate parameter (such as a property value in the Android system), a frame rate instruction, a frame rate configuration file, or the like.

Additionally, when updating the encoding frame rate by using the target frame rate, the encoding module may directly replace the encoding frame rate with the target frame rate to update the frame rate. For example, the target frame rate is 60 frames/second, and a current encoding frame rate is 30 frames/second. In this case, the current encoding frame rate may be directly changed from 30 frames/second to 60 frames/second to update the frame rate. Alternatively, a corresponding encoding sampling period may be set on a side of the target edge server according to the target frame rate to update the frame rate. For example, when the target frame rate is 60 frames/second, the encoding sampling period may be reset to $1/60$ second. Each time of sampling causes one image encoding operation to be performed on a game screen obtained through sampling. Therefore, the encoding module can encode 60 frames of game screens within one second, so that the target frame rate of the encoding module is 60 frames/second. Similarly, when the target frame rate is 30 frames/second, the encoding sampling period may be reset to $1/30$ second.

For the fixed sampling period encoding method, the target edge server may further determine, according to usage requirements, whether to further improve effective utilization of processing resources (such as GPU resources) by adjusting the rendering frame rate. For example, when the application scene of the target cloud game in the target game client is a hosting scene, the purpose of a player user of the target game client is not for a smooth operation, but for ensuring automatic running of the target cloud game in the hosting process. Therefore, in this case, only the low frame rate mode needs to be used. For example, the encoding frame rate is reduced from 60 frames/second to 15 frames/second (or even lower). Then, in such a scene, the target edge server can use the rendering frame rate adjustment method mentioned above, to further reduce the rendering frame rate of the rendering module by adjusting the generation period of vsync, so that use of the processing resources is more valuable, thereby improving effective utilization of the processing resources. Certainly, it is to be understood that a user input event such as a mouse click or a touchscreen touch is also related to the vsync mechanism. If the generation period of the software vsync is extended, a response speed of the target container to the user input event may be affected. Therefore, under a user requirement considering user operation smoothness, only the encoding frame rate of the encoding module may be adjusted and the rendering frame rate of the rendering module is not adjusted, so that both smoothness of the game screen and the user operation smoothness can be satisfied.

In another embodiment, a specific implementation of step S302 may alternatively be: determining a frame rate adjustment direction according to feedback information under each feedback indicator in the feedback data. The frame rate adjustment direction may include a frame rate increase direction or a frame rate decrease direction. Specifically, the feedback data may be first parsed according to a custom protocol agreed between the target edge server and the target game client to obtain the feedback information under the each feedback indicator (that is, a value of each protocol variable). Then, feedback information under each feedback indicator may be obtained to determine the frame rate adjustment direction. For example, if it is determined, according to a vendor identifier (that is, a value of a protocol variable cloudgame_gpu_vendor) of the GPU in the feedback information under the hardware configuration indicator and a model identifier (that is, a value of the protocol variable cloudgame_gpu_device_id) of the GPU in the feedback information, that a model of the target game client is later than a particular era or a particular version, or a scene identifier (that is, a value of a protocol variable cloudgame_scene_id) in the feedback information under the application scene indicator is a scene identifier of a non-hosting scene, or network dither information (that is, a value of a protocol variable cloudgame_network_dither) or a network packet loss rate (that is, a value of a protocol variable cloudgame_network_loss_rate) in the feedback information under the network status indicator falls within a preset value range, or a type identifier (that is, a value of a protocol variable cloudgame_user_type) in the feedback information under the user type indicator is a type identifier of a first type, it can be determined that the frame rate adjustment direction is a frame rate increase direction.

If it is determined, according to the vendor identifier (that is, the value of the protocol variable cloudgame_gpu_vendor) of the GPU in the feedback information under the hardware configuration indicator and the model identifier (that is, the value of cloudgame_gpu_device_id) of the GPU in the feedback information, that the model of the target game client is earlier than a particular era or a particular version, or a scene identifier (that is, the value of the protocol variable cloudgame_scene_id) in the feedback information under the application scene indicator is a scene identifier of a hosting scene, or network dither information (that is, the value of the protocol variable cloudgame_network_dither) or the network packet loss rate (that is, the value of the protocol variable cloudgame_network_loss_rate) in the feedback information under the network status indicator falls outside the preset value range, or the type identifier (that is, the value of the protocol variable cloudgame_user_type) in the feedback information under the user type indicator is a type identifier of a second type, it can be determined that the frame rate adjustment direction is a frame rate decrease direction.

Then, a frame rate adjustment factor corresponding to the frame rate adjustment direction may be obtained. The frame rate adjustment factor may be set according to a service requirement or an empirical value. In addition, a frame rate adjustment factor corresponding to the frame rate increase direction is a positive number, and a frame rate adjustment factor corresponding to the frame rate decrease direction is a negative number. Then, the encoding frame rate may be dynamically adjusted by using the frame rate adjustment factor to obtain an adjusted encoding frame rate. It can be learned from the foregoing description that the encoding method of the encoding module may be an on-demand encoding method or a fixed sampling period encoding method. In this case, correspondingly, if the encoding method is an on-demand encoding method, the encoding frame rate may be scaled (that is, scaled up or scaled down) by using the frame rate adjustment factor to obtain a scaled frame rate. Then, the rendering frame rate is adjusted according to the scaled frame rate, and the encoding frame rate is adjusted according to the adjusted rendering frame rate to obtain the adjusted encoding frame rate. For a specific implementation of adjusting the rendering frame rate according to the scaled frame rate, refer to the related implementation of adjusting the rendering frame rate according to the target frame rate. Details are not described herein again. If the encoding method is a fixed sampling period encoding method, the encoding frame rate may be directly scaled by using the frame rate adjustment factor to obtain the adjusted encoding frame rate. Specifically, adjustment information identifiable and acceptable to the encoding module may be directly generated according to the frame rate adjustment factor, and the adjustment information is transferred to the encoding module, so that the encoding module performs identification according to the adjustment information to obtain the frame rate adjustment factor, and then scales the encoding frame rate by using the frame rate adjustment factor to obtain the adjusted encoding frame rate. The adjustment information may include, but is not limited to: a parameter, an instruction, or a configuration file corresponding to the frame rate adjustment factor, or the like.

S303. Perform image encoding on a game screen of the target cloud game according to the adjusted encoding frame rate to obtain encoded data.

S304. Transmit the encoded data to the target game client.

S305. Determine an number of remaining resources of a GPU of the target edge server according to a total amount of resources and an number of occupied resources of the GPU of the target edge server.

The number of occupied resources includes at least an amount of resources occupied by the image encoding of the game screen. The number of resources occupied by the image encoding is usually related to the magnitude of the encoding frame rate. A higher encoding frame rate indicates a larger number of resources occupied by the image encoding. A lower encoding frame rate indicates a smaller number of resources occupied by the image encoding. It can be learned that, an amount of resources occupied by the image encoding of the game screen according to the adjusted encoding frame rate is less than an amount of resources occupied by the image encoding of the game screen according to the encoding frame rate, when the adjusted encoding frame rate is less than the encoding frame rate. In other words, an amount of remaining resources corresponding to the image encoding of the game screen according to the adjusted encoding frame rate is greater than an amount of remaining resources corresponding to the image encoding of the game screen according to the encoding frame rate, when the adjusted encoding frame rate is less than the encoding frame rate.

S306. Dynamically adjust the number of system containers running in the target edge server according to the number of remaining resources.

Specifically, at least one new system container may run in parallel in the target edge server when the number of remaining resources is greater than a resource threshold; or at least one running system container may stop running in the target edge server when the amount of remaining resources is less than or equal to a resource threshold. It can be learned that, the target edge server can further run one or more Android containers in real time when configurations such as the number of CPU cores and GPU memory all allow, thereby improving server utilization.

In this embodiment, the encoding frame rate can be dynamically adjusted by considering the frame rate requirement of the target game client, and image encoding is performed on the game screen of the target cloud game according to the adjusted encoding frame rate. In this way, processing resources occupied by the server side in the image encoding process are all valuable, and the occupancy of unnecessary processing resources can be reduced; thereby appropriately utilizing the processing resources on the server side and improving effective utilization of the processing resources. After the encoded data is obtained through image encoding, the encoded data obtained through image encoding can be transmitted to the target game client. Because the encoded data is obtained through encoding by considering the frame rate requirement of the target game client, the frame rate corresponding to the encoded data can be well adapted to the target game client, so that the target game client can well display the game screen according to the encoded data. In addition, the server may further adjust rendering and encoding capabilities on the server side to dynamically increase or decrease the number of simultaneously running system containers according to a GPU load status on the server side in real time. In a scene where there is no need to run in the high frame rate mode, costs of using a single system container on the server side can be reduced to a certain extent by reducing the encoding frame rate and/or the rendering frame rate, thereby effectively saving processing resources. Further, some new system containers can run concurrently on the server side based on the saved processing resources, so that utilization of the processing resources (such as GPU resources) on the server side can be greatly improved.

Figure 5:
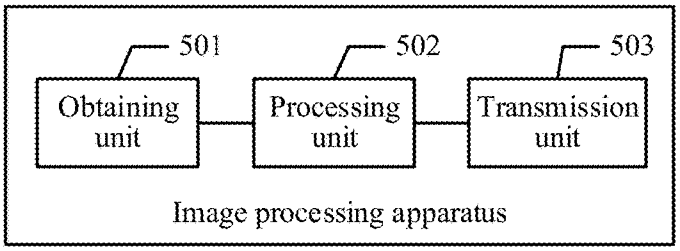
FIG. 5 is a schematic structural diagram of an image processing apparatus according to an embodiment of this application.

Based on the foregoing description of the embodiments of the image processing method, an embodiment of this application further discloses an image processing apparatus. The image processing apparatus may be a computer program (including program code) run in the target edge server. The image processing apparatus may perform the method shown in FIG. 2 and FIG. 3. Referring to FIG. 5, the image processing apparatus may operate the following units:

- an obtaining unit 501, configured to obtain, when running a target cloud game, feedback data transmitted by a target game client; the feedback data being used for reflecting a frame rate requirement of the target game client;
- a processing unit 502, configured to dynamically adjust an encoding frame rate according to the feedback data to obtain an adjusted encoding frame rate;
- the processing unit 502 being further configured to perform image encoding on a game screen of the target cloud game according to the adjusted encoding frame rate to obtain encoded data; and
- a transmission unit 503, configured to transmit the encoded data to the target game client, so that the target game client displays the game screen according to the encoded data.

In one embodiment, the target cloud game runs in a target container, and the target game client is connected to the target container. The feedback data includes feedback information associated with at least one feedback indicator, and the feedback indicator includes a hardware configuration indicator, an application scene indicator, a network status indicator, and a user type indicator.

Feedback information under the hardware configuration indicator includes at least one of the following: hardware information of a GPU corresponding to the target game client and hardware information of a CPU corresponding to the target game client.

Feedback information under the application scene indicator includes a scene identifier of an application scene of the target cloud game in the target game client. The application scene includes a hosting scene or a non-hosting scene. The hosting scene is a scene in which a program controls a game object corresponding to the target game client.

Feedback information under the network status indicator includes at least one of the following: a network bandwidth, network dither information, and a network packet loss rate.

Feedback information under the user type indicator includes a type identifier of a user type of a user account logged in to the target cloud game. The user type includes a first type or a second type, and a game service corresponding to the first type is superior to a game service corresponding to the second type.

In another embodiment, when configured to dynamically adjust the encoding frame rate according to the feedback data to obtain an adjusted encoding frame rate, the processing unit 502 may be specifically configured to:

- obtain a reference frame rate corresponding to feedback information under each feedback indicator in the feedback data, and calculate a target frame rate according to the reference frame rate corresponding to the feedback information under the each feedback indicator; and
- dynamically adjust the encoding frame rate according to an encoding method by using the target frame rate to obtain the adjusted encoding frame rate.

In another embodiment, one feedback indicator corresponds to one frame rate lookup table, and the frame rate lookup table includes multiple pieces of information and a frame rate corresponding to each piece of information; and

- a reference frame rate corresponding to feedback information under any feedback indicator in the feedback data is found by looking up a frame rate lookup table corresponding to the any feedback indicator.

In another embodiment, when configured to calculate the target frame rate according to the reference frame rate corresponding to the feedback information under the each feedback indicator, the processing unit 502 may be specifically configured to:

- select a lowest reference frame rate from the reference frame rates corresponding to the feedback information under the feedback indicators as the target frame rate; or perform a mean value operation on the reference frame rates corresponding to the feedback information under the feedback indicators to obtain the target frame rate; or obtain a weight value of each feedback indicator, and perform weighted summation on the reference frame rates corresponding to the feedback information under the feedback indicators by using the weight value of each feedback indicator to obtain the target frame rate.

In another embodiment, the game screen of the target cloud game is obtained through rendering by a rendering module, and the image encoding is performed by an encoding module. The encoding method is an on-demand encoding method, and the on-demand encoding method is a method in which the encoding module performs encoding according to a rendering progress of the rendering module. Correspondingly, when configured to dynamically adjust the encoding frame rate according to the encoding method by using the target frame rate to obtain the adjusted encoding frame rate, the processing unit 502 may be specifically configured to:

adjust a generation period of a hardware vertical sync semaphore according to the target frame rate to obtain an adjusted generation period of the hardware vertical sync semaphore;

synchronously adjust a generation period of a software vertical sync semaphore based on the adjusted generation period of the hardware vertical sync semaphore; the software vertical sync semaphore being generated based on the hardware vertical sync semaphore, and the software vertical sync semaphore being used for triggering screen rendering;

adjust a rendering frame rate of the rendering module by using an adjusted generation period of the software vertical sync semaphore; and dynamically adjust the encoding frame rate based on an adjusted rendering frame rate to obtain the adjusted encoding frame rate; the adjusted encoding frame rate being equal to the adjusted rendering frame rate.

In another embodiment, the game screen of the target cloud game is obtained through rendering by a rendering module, and the image encoding is performed by an encoding module. The encoding method is a fixed sampling period encoding method, and the fixed sampling period encoding method is a method in which the encoding module encodes, according to a fixed sampling period, the game screen rendered by the rendering module. Correspondingly, when configured to dynamically adjust the encoding frame rate according to the encoding method by using the target frame rate to obtain the adjusted encoding frame rate, the processing unit 502 may be specifically configured to:

update the encoding frame rate by using the target frame rate to obtain the adjusted encoding frame rate; the adjusted encoding frame rate being equal to the target frame rate.

In another embodiment, when configured to dynamically adjust the encoding frame rate according to the feedback data to obtain an adjusted encoding frame rate, the processing unit 502 may be specifically configured to:

determine a frame rate adjustment direction according to feedback information under each feedback indicator in the feedback data; the frame rate adjustment direction including a frame rate increase direction or a frame rate decrease direction; and obtain a frame rate adjustment factor corresponding to the frame rate adjustment direction, and dynamically adjust the encoding frame rate by using the frame rate adjustment factor to obtain the adjusted encoding frame rate.

In another embodiment, the target container is any system container running in a target edge server in a cloud gaming system. The processing unit 502 may be further configured to:

determine a number of remaining resources of a GPU of the target edge server according to a total amount of resources and an amount of occupied resources of the GPU of the target edge server; and dynamically adjust the number of system containers running in the target edge server according to the number of remaining resources;

the number of occupied resources including at least an amount of resources occupied by the image encoding of the game screen; and an amount of resources occupied by the image encoding of the game screen according to the adjusted encoding frame rate is less than an amount of resources occupied by the image encoding of the game screen according to the encoding frame rate, when the adjusted encoding frame rate is less than the encoding frame rate.

In another embodiment, when configured to dynamically adjust the number of system containers running in the target edge server according to the number of remaining resources, the processing unit 502 may be specifically configured to:

run at least one new system container in parallel in the target edge server when the number of remaining resources is greater than a resource threshold; or stop running at least one running system container in the target edge server when the number of remaining resources is less than or equal to a resource threshold.

According to an embodiment of this application, the steps involved in the method shown in FIG. 2 and FIG. 3 may be performed by the units of the image processing apparatus shown in FIG. 5. For example, step S201 shown in FIG. 2 may be performed by the obtaining unit 501 shown in FIG. 5, steps S202 and S203 may be performed by the processing unit 502 shown in FIG. 5, and step S204 may be performed by the transmission unit 503 shown in FIG. 5. In another example, step S301 shown in FIG. 3 may be performed by the obtaining unit 501 shown in FIG. 5, steps S302 and S303 may be performed by the processing unit 502 shown in FIG. 5, step S304 may be performed by the transmission unit 503 shown in FIG. 5, and steps S305 and S306 may be performed by the processor unit 502 shown in FIG. 5, and the like.

According to another embodiment of this application, the units of the image processing apparatus shown in FIG. 5 may be separately or wholly combined into one or several other units, or one (or more) of the units may further be divided into a plurality of units of smaller functions. In this way, same operations may be implemented, and the implementation of the technical effects of the embodiments of this application is not affected. The foregoing units are divided based on logical functions. In some embodiments, a function of one unit may also be implemented by multiple units, or functions of multiple units are implemented by one unit. In other embodiments of this application, the image processing apparatus may also include other units. In some embodiments, the functions may also be cooperatively implemented by other units and may be cooperatively implemented by a plurality of units.

According to another embodiment of this application, a computer program (including program code) that can perform the steps in the corresponding methods shown in FIG. 2 to FIG. 3 may be run on a general computing device, such as a computer, which include processing elements and storage elements such as a central processing unit (CPU), a random access memory (RAM), and a read-only memory (ROM), to construct the image processing apparatus shown in FIG. 5, and implement the image processing method in the embodiments of this application. The computer program may be recorded in, for example, a computer readable storage medium, and may be loaded into the foregoing computing device by using the computer readable storage medium, and run on the computing device.

In this embodiment, feedback data transmitted by a target game client may be obtained when running a target cloud game. The feedback data can reflect the frame rate requirement of the target game client. Therefore, the server can dynamically adjust the encoding frame rate by considering the frame rate requirement reflected by the feedback data, and perform image encoding on the game screen of the target cloud game according to the adjusted encoding frame rate. In this way, processing resources occupied by the server side in the image encoding process are all valuable, and the occupancy of unnecessary processing resources can be reduced; thereby appropriately utilizing the processing resources on the server side and improving effective utilization of the processing resources. After the encoded data is obtained through image encoding, the encoded data obtained through image encoding can be transmitted to the target game client. Because the encoded data is obtained through encoding by considering the frame rate requirement of the target game client, the frame rate corresponding to the encoded data can be well adapted to the target game client, so that the target game client can well display the game screen according to the encoded data.

Figure 6:
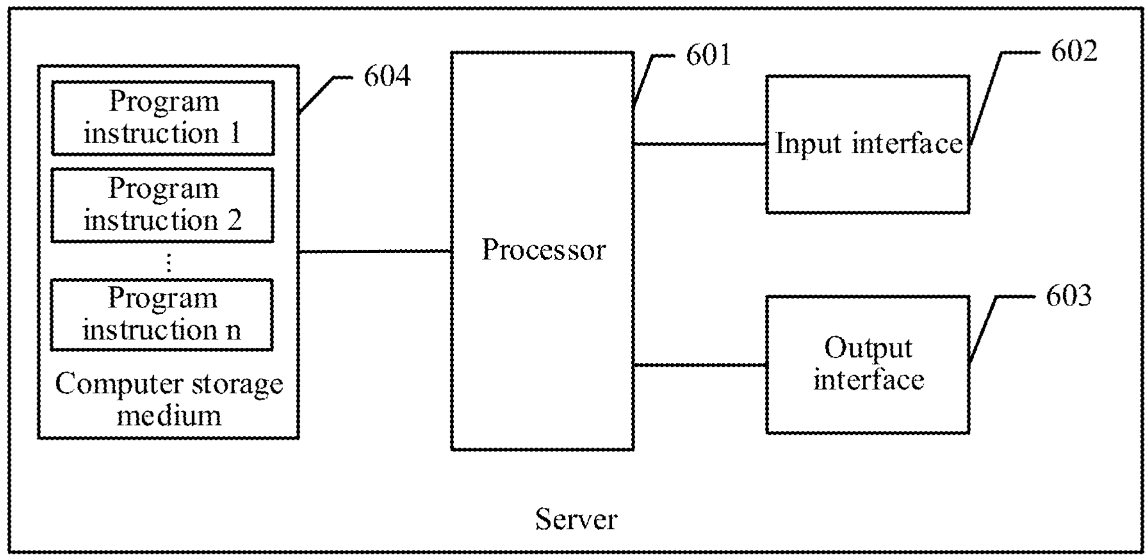
FIG. 6 is a schematic structural diagram of a server according to an embodiment of this application.

Based on the descriptions of the foregoing method embodiments and apparatus embodiments, an embodiment of this application further provides a server. The server may be the above target edge server. Referring to FIG. 6, the server includes at least a processor 601, an input device 602, an output device 603, and a computer storage medium 604. The processor 601, the input device 602, the output device 603, and the computer storage medium 604 in the server may be connected by a bus or other in another manner.

The computer storage medium 604 is a memory device in a server and is configured to store programs and data. The computer storage medium 604 herein may include an internal storage medium of the server and certainly may also include an extended storage medium supported by the server. The computer storage medium 604 provides storage space, and the storage space stores an operating system of the server. In addition, the storage space further stores one or more instructions adapted to be loaded and executed by the processor 601. The instructions may be one or more computer programs (including program code). The computer storage medium may be a high-speed RAM, or may be a non-transitory memory, for example, at least one magnetic disk memory; and the computer storage medium may be at least one computer storage medium far away from the foregoing processor. The processor 601 (or referred to as a central processing unit (CPU)) is a computing core and a control core of the server, is adapted to implement one or more instructions, and is specifically adapted to load and execute the one or more instructions to implement a corresponding method procedure or a corresponding function.

In one embodiment, the processor 601 may load and execute one or more instructions stored in the computer storage medium 604, to implement the corresponding method steps in the embodiments of the image processing method shown in FIG. 2 and FIG. 3. In some embodiments, specific implementation or more instructions in the computer storage medium 604 are loaded and executed by the processor 601 to further perform the following steps:

obtaining, when running a target cloud game, feedback data transmitted by a target game client; the feedback data being used for reflecting a frame rate requirement of the target game client;

dynamically adjusting an encoding frame rate according to the feedback data to obtain an adjusted encoding frame rate;

performing image encoding on a game screen of the target cloud game according to the adjusted encoding frame rate to obtain encoded data; and transmitting the encoded data to the target game client, so that the target game client displays the game screen according to the encoded data.

In an implementation, the target cloud game runs in a target container, and the target game client is connected to the target container. The feedback data includes feedback information associated with at least one feedback indicator, and the feedback indicator includes a hardware configuration indicator, an application scene indicator, a network status indicator, and a user type indicator.

Feedback information under the hardware configuration indicator includes at least one of the following: hardware information of a GPU corresponding to the target game client and hardware information of a CPU corresponding to the target game client.

Feedback information under the application scene indicator includes a scene identifier of an application scene of the target cloud game in the target game client. The application scene includes a hosting scene or a non-hosting scene. The hosting scene is a scene in which a program controls a game object corresponding to the target game client.

Feedback information under the network status indicator includes at least one of the following: a network bandwidth, network dither information, and a network packet loss rate.

Feedback information under the user type indicator includes a type identifier of a user type of a user account logged in to the target cloud game. The user type includes a first type or a second type, and a game service corresponding to the first type is superior to a game service corresponding to the second type.

In another embodiment, when dynamically adjusting the encoding frame rate according to the feedback data to obtain an adjusted encoding frame rate, the one or more instructions may be loaded by the processor 601 and specifically perform the following steps:

obtaining a reference frame rate corresponding to feedback information under each feedback indicator in the feedback data, and calculating a target frame rate according to the reference frame rate corresponding to the feedback information under the each feedback indicator; and dynamically adjusting the encoding frame rate according to an encoding method by using the target frame rate to obtain the adjusted encoding frame rate.

In another embodiment, one feedback indicator corresponds to one frame rate lookup table, and the frame rate lookup table includes multiple pieces of information and a frame rate corresponding to each piece of information; and a reference frame rate corresponding to feedback information under any feedback indicator in the feedback data is found by looking up a frame rate lookup table corresponding to the any feedback indicator.

In another embodiment, when calculating a target frame rate according to the reference frame rate corresponding to the feedback information under the each feedback indicator, the one or more instructions may be loaded by the processor 601 and specifically perform the following steps:

selecting a lowest reference frame rate from the reference frame rates corresponding to the feedback information under the feedback indicators as the target frame rate; or calculating a mean value on the reference frame rates corresponding to the feedback information under the feedback indicators to obtain the target frame rate; or obtaining a weight value of the each feedback indicator, and performing weighted summation on the reference frame rates corresponding to the feedback information under the feedback indicators by using the weight value of the each feedback indicator to obtain the target frame rate.

In another embodiment, the game screen of the target cloud game is obtained through rendering by a rendering module, and the image encoding is performed by an encoding module. The encoding method is an on-demand encoding method, and the on-demand encoding method is a method in which the encoding module performs encoding according to a rendering progress of the rendering module. Correspondingly, when dynamically adjusting the encoding frame rate according to an encoding method by using the target frame rate to obtain the adjusted encoding frame rate, the one or more instructions may be loaded by the processor 601 and specifically perform the following steps:

adjusting a generation period of a hardware vertical sync semaphore according to the target frame rate to obtain an adjusted generation period of the hardware vertical sync semaphore;

synchronously adjusting a generation period of a software vertical sync semaphore based on the adjusted generation period of the hardware vertical sync semaphore; the software vertical sync semaphore being generated based on the hardware vertical sync semaphore, and the software vertical sync semaphore being used for triggering screen rendering;

adjusting a rendering frame rate of the rendering module by using an adjusted generation period of the software vertical sync semaphore; and dynamically adjusting the encoding frame rate based on an adjusted rendering frame rate to obtain the adjusted encoding frame rate; the adjusted encoding frame rate being equal to the adjusted rendering frame rate.

In another embodiment, the game screen of the target cloud game is obtained through rendering by a rendering module, and the image encoding is performed by an encoding module. The encoding method is a fixed sampling period encoding method, and the fixed sampling period encoding method is a method in which the encoding module encodes, according to a fixed sampling period, the game screen rendered by the rendering module. Correspondingly, when dynamically adjusting the encoding frame rate according to an encoding method by using the target frame rate to obtain the adjusted encoding frame rate, the one or more instructions may be loaded by the processor 601 and specifically perform the following step:

updating the encoding frame rate by using the target frame rate to obtain the adjusted encoding frame rate; the adjusted encoding frame rate being equal to the target frame rate.

In another embodiment, when dynamically adjusting the encoding frame rate according to the feedback data to obtain an adjusted encoding frame rate, the one or more instructions may be loaded by the processor 601 and specifically perform the following steps:

determining a frame rate adjustment direction according to feedback information under each feedback indicator in the feedback data; the frame rate adjustment direction including a frame rate increase direction or a frame rate decrease direction; and obtaining a frame rate adjustment factor corresponding to the frame rate adjustment direction, and dynamically adjusting the encoding frame rate by using the frame rate adjustment factor to obtain the adjusted encoding frame rate.

In another embodiment, the target container is any system container running in a target edge server in a cloud gaming system. The one or more instructions may be loaded by the processor 601 and specifically perform the following steps:

determining a number of remaining resources of a GPU of the target edge server according to a total amount of resources and an amount of occupied resources of the GPU of the target edge server; and dynamically adjusting the number of system containers running in the target edge server according to the number of remaining resources;

the number of occupied resources including at least an amount of resources occupied by the image encoding of the game screen; and an amount of resources occupied by the image encoding of the game screen according to the adjusted encoding frame rate is less than an amount of resources occupied by the image encoding of the game screen according to the encoding frame rate, when the adjusted encoding frame rate is less than the encoding frame rate.

In another embodiment, when dynamically adjusting the number of system containers running in the target edge server according to the number of remaining resources, the one or more instructions may be loaded by the processor 601 and specifically perform the following step:

running at least one new system container in parallel in the target edge server when the number of remaining resources is greater than a resource threshold; or stopping running at least one running system container in the target edge server when the number of remaining resources is less than or equal to a resource threshold.

In this embodiment, feedback data transmitted by a target game client may be obtained when running a target cloud game. The feedback data can reflect the frame rate requirement of the target game client. Therefore, the server can dynamically adjust the encoding frame rate by considering the frame rate requirement reflected by the feedback data, and perform image encoding on the game screen of the target cloud game according to the adjusted encoding frame rate. In this way, processing resources occupied by the server side in the image encoding process are all valuable, and the occupancy of unnecessary processing resources can be reduced; thereby appropriately utilizing the processing resources on the server side and improving effective utilization of the processing resources. After the encoded data is obtained through image encoding, the encoded data obtained through image encoding can be transmitted to the target game client. Because the encoded data is obtained through encoding by considering the frame rate requirement of the target game client, the frame rate corresponding to the encoded data can be well adapted to the target game client, so that the target game client can well display the game screen according to the encoded data.

According to an aspect of this application, a computer program product or a computer program is further provided, the computer program product or the computer program including computer instructions, the computer instructions being stored in a computer-readable storage medium. A processor of a computing device reads the computer instructions from the computer-readable storage medium, and executes the computer instructions, so that the computing device performs the method provided in the implementations of the embodiments of the image processing method shown in FIG. 2 and FIG. 3.

What are disclosed above are merely examples of embodiments of this application, and certainly are not intended to limit the protection scope of this application. Therefore, equivalent variations made in accordance with the claims of this application shall fall within the scope of this application.

What is claimed is:

1. An image processing method, performed by a target edge server in a cloud gaming system, the target edge server comprising a graphics processing unit (GPU), and the method comprising:

obtaining, when running a target cloud game in a target container, feedback data transmitted by a target game client, the feedback data reflecting a frame rate need of the target game client, wherein the target container is one of a plurality of system containers running on the target edge server, and the target game client is connected to the target container;

determining an encoding frame rate according to the feedback data;

performing image encoding on a game screen of the target cloud game according to the encoding frame rate to obtain encoded data;

transmitting the encoded data to the target game client;

determining an amount of remaining resources of the GPU of the target edge server according to a total amount of resources and an amount of occupied resources of the GPU of the target edge server, wherein the amount of occupied resources comprises at least an amount of resources occupied by the image encoding of the game screen, and the total amount of resources of the GPU comprises at least an amount of GPU memory; and adjusting a quantity of the plurality of system containers running in the target edge server according to the amount of remaining resources.

2. The method according to claim 1, wherein the feedback data comprises feedback information associated with at least one feedback indicator among a hardware configuration indicator, an application scene indicator, a network status indicator, and a user type indicator.

3. The method according to claim 2, wherein the determining an encoding frame rate according to the feedback data comprises:

adjusting a current encoding frame rate based on the feedback data to obtain the encoding frame rate.

4. The method according to claim 3, wherein the determining an encoding frame rate according to the feedback data comprises:

obtaining a reference frame rate corresponding to feedback information associated with at least one feedback indicator in the feedback data, and calculating a target frame rate according to the reference frame rate corresponding to the feedback information associated with the at least one feedback indicator; and adjusting the current encoding frame rate according to an encoding method by using the target frame rate to obtain the encoding frame rate.

5. The method according to claim 4, wherein one feedback indicator corresponds to one frame rate lookup table, and the frame rate lookup table comprises multiple pieces of information and a frame rate corresponding to each piece of information; and a reference frame rate corresponding to feedback information associated with a feedback indicator in the feedback data is identified by looking up a frame rate lookup table corresponding to the feedback indicator.

6. The method according to claim 4, wherein the calculating a target frame rate according to the reference frame rate corresponding to the feedback information associated with at least one feedback indicator comprises:

selecting a lowest reference frame rate from the reference frame rates corresponding to the feedback information associated with the feedback indicators as the target frame rate.

7. The method according to claim 4, wherein the calculating a target frame rate according to the reference frame rate corresponding to the feedback information associated with at least one feedback indicator comprises:

calculating a mean value of the reference frame rates corresponding to the feedback information associated with the feedback indicators to obtain the target frame rate.

8. The method according to claim 4, wherein the calculating a target frame rate according to the reference frame rate corresponding to the feedback information associated with at least one feedback indicator comprises:

obtaining a weight value of each feedback indicator, and performing weighted summation on the reference frame rates corresponding to the feedback information associated with the feedback indicators by using the weight value of each feedback indicator to obtain the target frame rate.

9. The method according to claim 4, wherein the game screen of the target cloud game is obtained through rendering by a rendering module, and the image encoding is performed by an encoding module; the encoding method is an on-demand encoding method, and the on-demand encoding method is a method in which the encoding module performs encoding according to a rendering progress of the rendering module; and the adjusting the current encoding frame rate according to an encoding method by using the target frame rate to obtain the encoding frame rate comprises:

adjusting a generation period of a hardware vertical sync semaphore according to the target frame rate to obtain an adjusted generation period of the hardware vertical sync semaphore;

synchronously adjusting a generation period of a software vertical sync semaphore based on the adjusted generation period of the hardware vertical sync semaphore; the software vertical sync semaphore being generated based on the hardware vertical sync semaphore, and the software vertical sync semaphore being used for triggering screen rendering;

adjusting a rendering frame rate of the rendering module by using an adjusted generation period of the software vertical sync semaphore; and adjusting the current encoding frame rate based on an adjusted rendering frame rate to obtain the encoding frame rate; the encoding frame rate being equal to the adjusted rendering frame rate.

10. The method according to claim 4, wherein the game screen of the target cloud game is obtained through rendering by a rendering module, and the image encoding is performed by an encoding module; the encoding method is a fixed sampling period encoding method, and the fixed sampling period encoding method is a method in which the encoding module encodes, according to a fixed sampling period, the game screen rendered by the rendering module, the adjusting the current encoding frame rate according to an encoding method by using the target frame rate to obtain the encoding frame rate comprises:

updating the current encoding frame rate by using the target frame rate to obtain the encoding frame rate, the encoding frame rate being equal to the target frame rate.

11. The method according to claim 3, wherein the adjusting a current encoding frame rate according to the feedback data to obtain the encoding frame rate comprises:

determining a frame rate adjustment instruction according to feedback information associated with at least one feedback indicator in the feedback data, the frame rate adjustment instruction comprising a frame rate increase instruction or a frame rate decrease instruction; and obtaining a frame rate adjustment factor corresponding to the frame rate adjustment instruction, and adjusting the current encoding frame rate by using the frame rate adjustment factor to obtain the encoding frame rate.

12. The method according to claim 1, wherein the amount of resources occupied by the image encoding of the game screen according to the encoding frame rate is less than an amount of resources occupied by the image encoding of the game screen according to a current encoding frame rate, when the encoding frame rate is less than the current encoding frame rate.

13. The method according to claim 1, wherein the adjusting the number of system containers running in the target edge server according to the number of remaining resources comprises:

running at least one new system container in parallel in the target edge server when the amount of remaining resources is greater than a resource threshold.

14. The method according to claim 1, wherein the adjusting the number of system containers running in the target edge server according to the number of remaining resources comprises:

stopping running at least one running system container in the target edge server when the amount of remaining resources is less than or equal to a resource threshold.

15. A target edge server in a cloud gaming system, comprising:

a computer storage medium, configured to store one or more instructions; and a processor comprising a graphics processing unit (GPU), the processor being configured to load the one or more instructions stored in the computer storage medium to perform operations comprising:

obtaining, when running a target cloud game in a target container, feedback data transmitted by a target game client, the feedback data reflecting a frame rate need of the target game client, wherein the target container is one of a plurality of system containers running on the target edge server, and the target game client is connected to the target container;

determining an encoding frame rate according to the feedback data;

performing image encoding on a game screen of the target cloud game according to the encoding frame rate to obtain encoded data;

transmitting the encoded data to the target game client;

determining an amount of remaining resources of the GPU of the target edge server according to a total amount of resources and an amount of occupied resources of the GPU of the target edge server, wherein the amount of occupied resources comprises at least an amount of resources occupied by the image encoding of the game screen, and the total amount of resources of the GPU comprises at least an amount of GPU memory; and adjusting a quantity of the plurality of system containers running in the target edge server according to the amount of remaining resources.

16. The server according to claim 15, wherein the feedback data comprises feedback information associated with at least one feedback indicator among a hardware configuration indicator, an application scenario indicator, a network status indicator, and a user type indicator.

17. The server according to claim 16, wherein the operations further comprise:

adjusting a current encoding frame rate based on the feedback data to obtain the encoding frame rate.

18. The server according to claim 17, wherein the operations further comprise:

obtaining a reference frame rate corresponding to feedback information associated with at least one feedback indicator in the feedback data, and calculate a target frame rate according to the reference frame rate corresponding to the feedback information associated with the at least one feedback indicator; and adjusting the current encoding frame rate according to an encoding method by using the target frame rate.

19. The server according to claim 18, wherein one feedback indicator corresponds to one frame rate lookup table, and the frame rate lookup table comprises multiple pieces of information and a frame rate corresponding to each piece of information; and a reference frame rate corresponding to feedback information associated with a feedback indicator in the feedback data is identified by looking up a frame rate lookup table corresponding to the feedback indicator.

20. A non-transitory computer readable storage medium, storing one or more instructions, the one or more instructions being adapted to be loaded by a processor of a target edge server in a cloud gaming system and perform:

obtaining, when running a target cloud game in a target container, feedback data transmitted by a target game client, the feedback data reflecting a frame rate need of the target game client, wherein the target container is one of a plurality of system containers running on the target edge server, and the target game client is connected to the target container;

determining an encoding frame rate according to the feedback data;

performing image encoding on a game screen of the target cloud game according to the encoding frame rate to obtain encoded data;

transmitting the encoded data to the target game client;

determining an amount of remaining resources of a graphics processing unit (GPU) of the target edge server according to a total amount of resources and an amount of occupied resources of the GPU of the target edge server, wherein the amount of occupied resources comprises at least an amount of resources occupied by the image encoding of the game screen, and the total amount of resources of the GPU comprises at least an amount of GPU memory; and adjusting a quantity of the plurality of system containers running in the target edge server according to the amount of remaining resources.

* * * * *